(12) United States Patent
Berman et al.

(10) Patent No.: US 7,417,397 B2
(45) Date of Patent: Aug. 26, 2008

(54) AUTOMATED SHADE CONTROL METHOD AND SYSTEM

(75) Inventors: Joel Berman, Hewlett, NY (US); Jan Berman, Wilton, CT (US); Alex Greenspan, Rockville Center, NY (US); Steve Hebeisen, Somers, NY (US)

(73) Assignee: Mechoshade Systems, Inc., Long Island City, NY (US)

( * ) Notice: Subject to any disclaimer, the term of this patent is extended or adjusted under 35 U.S.C. 154(b) by 501 days.

(21) Appl. No.: 11/162,377

(22) Filed: Sep. 8, 2005

(65) Prior Publication Data

US 2006/0207730 A1    Sep. 21, 2006

Related U.S. Application Data

(63) Continuation-in-part of application No. 10/906,817, filed on Mar. 8, 2005, now abandoned.

(60) Provisional application No. 60/521,497, filed on May 6, 2004.

(51) Int. Cl.
*E06B 9/24* (2006.01)
(52) U.S. Cl. .................. 318/468; 318/286; 318/480
(58) Field of Classification Search ......... 318/265–267, 318/286, 466–469, 480, 484
See application file for complete search history.

(56) References Cited

U.S. PATENT DOCUMENTS

| | | | |
|---|---|---|---|
| 2,464,623 A | 3/1949 | Vogel | |
| 3,042,001 A | 7/1962 | Dubie | |
| 3,294,152 A | 12/1966 | Kuijvenhoven | |
| 3,675,023 A | 7/1972 | Kunke et al. | |
| 3,696,845 A | 10/1972 | Acker et al. | |
| 3,710,597 A | 1/1973 | Schmidt | |
| 3,860,055 A | 1/1975 | Wild | |
| 3,965,348 A | 6/1976 | Anetseder, Sr. et al. | |
| 4,377,195 A | 3/1983 | Weil | |
| 4,397,346 A | 8/1983 | Chumbley et al. | |
| 4,610,294 A | 9/1986 | Anesi et al. | |
| 4,698,276 A | 10/1987 | Duval | |
| 4,712,104 A * | 12/1987 | Kobayashi | 340/825.52 |

(Continued)

FOREIGN PATENT DOCUMENTS

JP    01219283 A    9/1989

(Continued)

*Primary Examiner*—Bentsu Ro
(74) *Attorney, Agent, or Firm*—Snell & Wilmer L.L.P.

(57) ABSTRACT

This invention generally relates to automated shade systems that employ one or more algorithms to provide appropriate solar protection from direct solar penetration; reduce solar heat gain; reduce radiant surface temperatures; control penetration of the solar ray, optimize the interior natural daylighting of a structure and optimize the efficiency of interior lighting systems. The invention additionally comprises a motorized window covering, radiometers, and a central control system that uses algorithms to optimize the interior lighting of a structure. These algorithms include information such as: geodesic coordinates of a building; solar position; solar angle solar radiation; solar penetration angles; solar intensity; the measured brightness and veiling glare across a surface; time, solar altitude, solar azimuth, detected sky conditions, ASHRAE sky models, sunrise and sunset times, surface orientations of windows, incidence angles of the sun striking windows, window covering positions, minimum BTU load and solar heat gain.

27 Claims, 6 Drawing Sheets

U.S. PATENT DOCUMENTS

| | | |
|---|---|---|
| 4,727,918 A | 3/1988 | Schroeder |
| 4,864,201 A | 9/1989 | Bernot |
| 4,915,763 A | 4/1990 | Swiszcz |
| 4,979,550 A | 12/1990 | Long et al. |
| 5,063,984 A | 11/1991 | Cherveny |
| 5,142,133 A | 8/1992 | Kern et al. |
| 5,205,333 A | 4/1993 | Judkins |
| 5,371,447 A | 12/1994 | Boss |
| 5,532,560 A | 7/1996 | Element et al. |
| 5,566,471 A | 10/1996 | Hirano |
| 5,598,000 A * | 1/1997 | Popat .................. 250/206 |
| 5,648,656 A | 7/1997 | Begemann et al. |
| 5,655,585 A | 8/1997 | Fry |
| 5,662,147 A | 9/1997 | Haiber |
| 5,663,621 A | 9/1997 | Popat |
| 5,675,487 A | 10/1997 | Patterson et al. |
| 5,793,174 A * | 8/1998 | Kovach et al. ............. 318/468 |
| 6,024,156 A | 2/2000 | Chu |
| 6,084,231 A | 7/2000 | Popat |
| 6,103,345 A | 8/2000 | Oshima et al. |
| 7,085,627 B2 * | 8/2006 | Bamberger et al. ......... 700/277 |

FOREIGN PATENT DOCUMENTS

| | | |
|---|---|---|
| JP | 03017381 A | 1/1991 |
| JP | 04044589 A | 2/1992 |
| JP | 2001295154 A | 10/2001 |

* cited by examiner

AUTOMATED SHADE CONTROL METHOD AND SYSTEM

CROSS-REFERENCE TO RELATED APPLICATIONS

This invention is a continuation-in-part of U.S. application Ser. No. 10/906,817 filed on Mar. 8, 2005, and entitled "AUTOMATED SHADE CONTROL METHOD AND SYSTEM." The '817 application itself claims priority to and the benefit of U.S. Provisional Application No. 60/521,497 filed on May 6, 2004, and entitled "AUTOMATED SHADE CONTROL METHOD AND SYSTEM," the entire contents of both are hereby incorporated by reference.

FIELD OF INVENTION

This invention generally relates to automatic shade control, and more specifically, to automated shade systems that employ one or more algorithms to provide appropriate solar protection from direct solar penetration; reduction in solar heat gain; reduction in radiant surface temperatures (of the window wall); controlled penetration of the solar ray, optimization of the interior natural daylighting of a structure and optimization of the efficiency of interior lighting systems.

BACKGROUND OF INVENTION

A variety of automated systems currently exist for controlling blinds, drapery, and other types of window coverings. These systems often employ photo sensors to detect the light entering through a window. The photo sensors may be connected to a computer and/or a motor that automatically opens or closes the window covering based upon the photo sensor and/or temperature read-out.

While photo sensors and temperature sensors may be helpful in determining the ideal shading for a window or interior, these sensors may not be entirely effective. As such, some shade control systems employ other criteria or factors to help define the shading parameters. For example, some systems employ detectors for detecting the angle of incidence of sunlight. Other systems use rain sensors, artificial lighting controls, geographic location information, date and time information, window orientation information, exterior and interior photo sensors to quantify and qualify an optimum position for a window covering. However, no single system currently employs all of these types of systems and controls.

Moreover, most automated systems are designed for, and limited for use with, Venetian blinds, curtains and other traditional window coverings. Further, prior art systems generally do not utilize information related to the variation of light level within the interior of a structure. That is, most systems consider the effects of relatively uniform shading and/or brightness and veiling glare, rather than graduated shading and/or brightness and veiling glare. Therefore, there is a need for an automated shade control system that contemplates graduated shading and optimum light detection and adaptation.

It has been determined that the most efficient energy design for buildings is to be able to take advantage of natural daylight which allows for the reduction in artificial lighting which in turn reduces the Air Conditioning load, which reduces the energy consumption of a building. To achieve these goals, the glazing has to allow a high percentage of daylight to penetrate the glazing, by using clear or high visible light transmitting glazing. But with the high amount of visible light there is also the bright orb of the sun, excessive heat gain, and debilitating solar rays which will at different times of the year and on different solar orientations penetrate deeply into the building, effecting and impacting on persons working or living therein. Thus, a need exists to manage and control the amount of solar load, solar penetration, and temperatures of the window wall. In addition, there is a need to control the amount of solar radiation and brightness to acceptable norms that protect the comfort and health of the occupants, e.g. an energy conserving integrated sub-system.

SUMMARY OF INVENTION

A system and method for controlling the daylighting and interior lighting, the solar heat gain, the penetration of the solar ray, and the brightness of the window wall or portion thereof of an interior space is disclosed. The invention comprises one or more motorized window coverings. The invention may also include the use of one or more proactive, reactive, and/or other algorithms to optimize the interior lighting of a structure. One or more factors may be incorporated into the algorithms including, for example: the geodesic coordinates of a building; the actual and calculated solar position; the actual and calculated solar angle; the actual and calculated solar radiation; the actual and calculated solar penetration angle; the actual and calculated solar intensity; the measured brightness and veiling glare (luminance and illuminance) across the height of the window wall on a facade, task surface, ceiling and floor; the year-day time, solar declination, solar altitude, solar azimuth, algorithms to determine sky conditions (e.g. clear sky, intermittent cloudy sky, bright overcast sky and dark sky conditions), sky conditions, sunrise and sunset times, location of radiometers, the surface orientation of a window, the compass reading of a window, the incidence angle of the sun striking a window, the window covering positions for a window, information about the shadowing of the topography surrounding a building and/or the solar heat gain.

The automated shade control system may also contemplate the use of one or more radiometers, visible spectrum photo sensors and/or temperature sensors. The automated shade control system may also include a user interface, manual overrides, and interaction with building management and lighting systems.

The automated shade control system of the present invention also includes solar radiometers to measure total solar radiation as well as local area daylight brightness sensors to measure the visible light spectrum. The output of these radiometers and sensors are used in conjunction with automated shade control algorithms to help reduce excessive brightness, veiling glare, and debilitating beamed reflective illumination from bright surfaces from entering the building. This invention further helps maintain a relative brightness of a window area with respect to the brightness of interior surfaces and/or computer screens.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
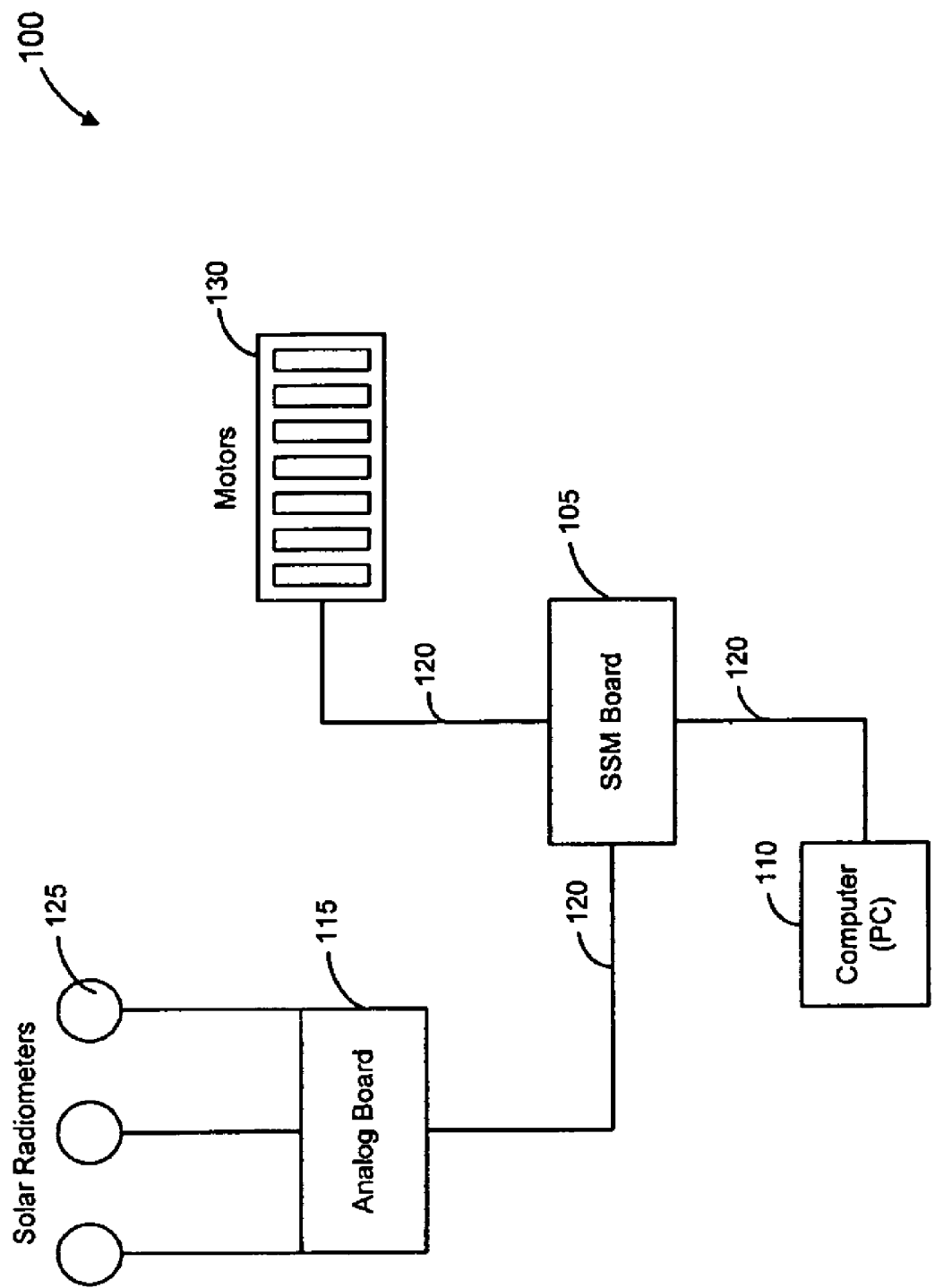
FIG. 1 illustrates a block diagram of an exemplary automated shade control system in accordance with the present invention.

The detailed description of exemplary embodiments of the invention herein shows the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may be described herein in terms of block diagrams, screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, Delphi, extensible markup language (XML), smart card technologies with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, and Source Code In C," by Bruce Schneier, published by John Wiley & Sons (second edition, 1996); (2) "Java Cryptography" by Jonathan Knudson, published by O'Reilly & Associates (1998); (3) "Cryptography and Network Security: Principles and Practice" by William Stallings, published by Prentice Hall; all of which are hereby incorporated by reference.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point-of-interaction device (point-of-sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI, Lonworks or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols," (1998); "Java 2 Complete," various authors, (Sybex 1999); Deborah Ray and Eric Ray, "Mastering HTML 4.0," (1997); Loshin, "TCP/IP Clearly Explained," (1997); and David Gourley and Brian Totty, "HTTP, The Definitive Guide," (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, "Understanding Data Communications," (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

FIG. 1 illustrates an exemplary automated shade control (ASC) system 100 in accordance with the present invention. ASC 100 may be configured with a smart sub master board (SSM board) 105 configured for communicating with centralized control system (CCS) 110, motors 130, and analog board 115. Analog board 115 may be configured to further communicate with radiometers 125. Both SSM board 105 and analog board 115 may communicate with CCS 110, motors 130, radiometers 125 and/or any other components through communication links 120. For example, in one embodiment, SSM board 105, analog board 115 and CCS 110 are configured to communicate directly with motors 130 to minimize lag time between computing commands and motor movement.

SSM Board 105 may be configured to facilitate transmitting shade position commands and/or other commands. SSM Board 105 may also be configured to interface between CCS 110 and motors 130. SSM board 105 may be configured to facilitate user access to motors 130. By facilitating user access, SSM board 105 may be configured to facilitate communication between a user and motors 130. For example, SSM board 105 may allow a user to access some or all of the functions of motors 130 for any number of zones. SSM board 105 may use communication links 120 for communication, user input, and/or any other communication mechanism for providing user access.

SSM board 105 may be configured as hardware and/or software. While FIG. 1 depicts a single SSM board 105, ASC 100 may comprise multiple SSM boards 105. In one embodiment, SSM board 105 may be configured to allow a user to control motors 130 for multiple window coverings. As used herein, a zone refers to any area of a structure wherein ASC 100 is configured to control the shading. For example, an office building may be divided into eight zones, each zone corresponding to a different floor. Each zone, in turn may have 50 different glazings, windows and/or window coverings. Thus, SSM board 105 may facilitate controlling each motor in each zone, every window covering for every floor, and/or multiple SSM boards 105 (i.e., eight different SSM boards 105) may be coupled together to collectively control every window covering, wherein each SSM board 105 controls the motors 130 for each floor.

SSM board 105 may also be configured with one or more safety mechanisms. For example, SSM board 105 may comprise one or more override buttons to facilitate manual operation of one or more motors 130 and/or SSM boards 105. SSM board 105 may also be configured with a security mechanism that requires entry of a password, code, biometric, or other identifier/indicia suitably configured to allow the user to interact or communicate with the system, such as, for example, authorization/access code, personal identification number (PIN), Internet code, bar code, transponder, digital certificate, biometric data, and/or other identification indicia.

CCS 110 may be used to facilitate communication with and/or control of SSM board 105 and/or analog board 115. CCS 110 may be configured to facilitate computing of one or more algorithms to determine, for example, solar radiation levels, sky type, interior lighting information, exterior lighting information, temperature information, glare information and the like. CCS 110 algorithms may include proactive and reactive algorithms configured to provide appropriate solar protection from direct solar penetration; reduce solar heat gain; reduce radiant surface temperatures and/or veiling glare; control penetration of the solar ray, optimize the interior natural daylighting of a structure and/or optimize the efficiency of interior lighting systems. CCS 110 may be configured with a RS-485 communication board to facilitate receiving and transmitting data from analog board 115 and/or SSM board 105. CCS 110 may be configured to automatically self-test, synchronize and/or start the various other components of ASC 100. CCS 110 may be configured to run one or more user interfaces to facilitate user interaction. An example of a user interface used in conjunction with CCS 110 is described in greater detail below.

CCS 110 may be configured as any type of personal computer, network computer, work station, minicomputer, mainframe, or the like running any operating system such as any version of Windows, Windows NT, Windows XP, Windows 2000, Windows 98, Windows 95, MacOS, OS/2, BeOS, Linux, UNIX, Solaris, MVS, DOS or the like. The various CCS 110 components or any other components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. The user may interact with the system via any input device such as, a keypad, keyboard, mouse, kiosk, personal digital assistant, handheld computer (e.g., Palm Pilots, Blueberry®), cellular phone and/or the like.

CCS 110 may also be configured with one or more browsers, remote switches and/or touch screens to further facilitate access and control of ASC 100. For example, each touch screen communicating with CCS 110 can be configured to facilitate control of a section of a building's floor plan, with motor zones and shade zones indicated (described further herein). A user may use the touch screen to select a motor zone and/or shade zone to provide control and/or obtain control and/or alert information about the shade position of that particular zone, current sky condition information, sky charts, global parameter information (such as, for example, local time and/or date information, sunrise and/or sunset information, solar altitude or azimuth information, and/or any other similar information noted herein), floor plan information (including sensor status and location) and the like. The touch screen may also be used to provide control and/or information about the brightness level of a local sensor, to provide override capabilities of the shade position to move a shade to a more desired location, and/or to provide access to additional shade control data that is captured for each particular zone. The browser, touch screen and/or switches may also be configured to log user-directed movement of the shades, manual over-rides of the shades, and other occupant-specific adaptations to ASC 100 and/or each shade and/or motor zone. As another example, the browser, touch screen and/or switches may also be configured to provide remote users access to particular data and shade functions depending upon each remote user's access level. For example, the access levels may, for example, be configured to permit only certain individuals, levels of employees, companies, or other entities to access ASC 100, or to permit access to specific ASC 100 control parameters. Furthermore, the access controls may restrict/permit only certain actions such as opening, closing, and/or moving shades. Restrictions on radiometer controls, algorithms, and the like may also be included.

CCS 110 may also be configured with one or more motor controllers. The motor controller may be equipped with one or more algorithms which enable it to position the window covering based on automated and/or manual control from the user through one or a variety of different user interfaces which communicate to the controller. CCS 110 may provide control of the motor controller via hardwired low voltage dry contact, hardwired analog, hardwired line voltage, voice, wireless IR, wireless RF or any one of a number of low voltage, wireless and/or line voltage networking protocols such that a multiplicity of devices including but not limited to switches, touch screens, PCs, Internet Appliances, infrared remotes, radio frequency remotes, voice commands, PDAs, cell phones, PIMs, etc. are capable of being employed by a user to automatically and/or manually override the position of the window covering. CCS 110 and/or the motor controller may additionally be configured with a real time clock to facilitate real time synchronization and control of environmental and manual override information.

CCS 110 and/or the motor controller is also equipped with algorithms which enable it to optimally position the window covering for function, energy efficiency, light pollution control (depending on the environment and neighbors), cosmetic and/or comfort automatically based on information originating from a variety of sensing device options which can be configured to communicate with the controller via any of the communication protocols and/or devices described herein. The automation algorithms within the motor controller and/or CCS 110 may be equipped to apply both proactive and reactive routines to facilitate control of motors 130. Proactive and reactive control algorithms are described in greater detail herein.

CCS 110 algorithms may use this log data to track each occupant-initiated override to learn what each local zone occupant desires for his optimal shading. This ASC 100 data tracking may then be used to automatically readjust zone-specific CCS 110 algorithms to adjust the sensors, motors 130 and/or other ASC 100 system components to the needs of the occupants at a local level. That is, ASC 100 may be configured to actively track each occupant's adjustments for each occupied zone and actively modify CCS 110 algorithms to automatically adapt to each adjustment for that particular occupied zone. CCS 110 algorithms may include a touch screen survey function. For example, this function may allow a user to select from a menu of reasons prior to overriding a shade position from the touch screen. This data may be saved in a database associated with CCS 110 and used to fine tune ASC 100 parameters in order to minimize the need for such overrides. Thus, CCS 110 can actively learn how a building's occupants use the shades, and adjust to these shade uses.

For example, proactive and reactive control algorithms may be used based on CCS 110 knowledge of how a building's occupants use window coverings. CCS 110 may be configured with one or more proactive/reactive control algorithms that proactively input information to/from the motor controller facilitate adaptability of ASC 100. Proactive control algorithms include information such as, for example, the continuously varying solar angles established between the sun and the window opening over the each day of the solar day. This solar tracking information may be combined with knowledge about the structure of the building and window opening, as well. This structural knowledge includes, for example, any shadowing features of the building (such as, for example, buildings in the cityscape and topographical conditions that may shadow the sun's ray on the window opening at various times throughout the day/year). Further still, any inclination or declination angles of the window opening (i.e., window, sloped window, and/or skylight), any scheduled positioning of the window covering throughout the day/year, information about the BTU load impacting the window at anytime throughout the day/year; the glass characteristics which affect transmission of light and heat through the glass, and/or any other historical knowledge about performance of the window covering in that position from previous days/years may be included in the proactive control algorithms. Proactive algorithms can be setup to optimize the positioning of the window covering based on a typical day, worst case bright day or worst case dark day depending on the capabilities and information made available to the reactive control algorithms. These algorithms further can incorporate at least one of the geodesic coordinates of a building; the actual and/or calculated solar position; the actual and/or calculated solar angle; the actual and/or calculated solar penetration angle; the actual and/or calculated solar penetration depth through the window, the actual and/or calculated solar radiation; the actual and/or calculated solar intensity; the time; the solar altitude; the solar azimuth; sunrise and sunset times; the surface orientation of a window; the slope of a window; the window covering stopping positions for a window; and the actual and/or calculated solar heat gain through the window.

Reactive control algorithms may be established to refine the proactive algorithms and/or to compensate for areas of the building which cannot be modeled for some reason. Reactive control of ASC 100 may include, for example, using sensors coupled with algorithms which determine the sky conditions, brightness of the external horizontal sky, brightness of the external vertical sky in any/all orientation(s), internal vertical brightness across the whole or a portion of a window, internal vertical brightness measured across the whole or a portion of a window covered by the window covering, internal horizontal brightness of an internal task surface, brightness of a vertical or horizontal internal surface such as the wall, floor or ceiling, comparative brightness between differing internal horizontal and/or vertical surfaces, internal brightness of a PC display monitor, external temperature, internal temperature, manual positioning by the user/occupant near or affected by the window covering setting, overrides of automated window covering position from previous years and/or real time information communicated from other motor controllers affecting adjacent window coverings.

Typical sensors facilitating these reactive control algorithms include radiometers, photometers/photosensors and/or temperature sensors. Motion sensors may also be employed in order to change reactive control algorithms in certain spaces such as conference rooms during periods where people are not present in order to optimize energy efficiency. The invention contemplates various types of sensor mounts. For example, types of photosensor and temperature sensor mounts include handrail mounts (between the shade and window glass), furniture mounts (e.g., on the room side of the shade), wall or column mounts that look directly out the window from the room side of the shade, and external sensor mounts. For example, for brightness override protection, one or more photosensors and/or radiometers may be configured to look through a specific portion of a window wall (e.g., the part of the window wall whose view gets covered by the window covering at some point during the movement of the window covering). If the brightness on the window wall portion is greater than a pre-determined ratio, the brightness override protection may be activated. The pre-determined ratio may be established from the brightness of the PC/VDU or actual measured brightness of a task surface. Each photosensor may be controlled, for example, by closed and/or open loop algorithms that include measurements from one or more field-of-views of the sensors. For example, each photosensor may look at a different part of the window wall and/or window covering. The information from these photosensors may be used to anticipate changes in brightness as the window covering travels across a window, measure indirectly the brightness coming through a portion of the window wall by looking at the brightness reflecting off an interior surface, measure brightness detected on the incident side of the window covering and/or to measure the brightness detected for any other field of view. The brightness control algorithms and/or other algorithms may also be configured to take into account whether any of the sensors are obstructed (for example, by a computer monitor, etc.). ASC 100 may also employ other sensors; for example, one or more motion sensors may be configured to employ stricter comfort control routines when the building spaces are occupied. That is, if a room's motion sensors detect a large number of people inside a room, ASC 100 may facilitate movement of the window coverings to provide greater shading and cooling of the room.

In another exemplary embodiment of the present invention, the natural default operation of the motor controller in "Automatic Mode" may be governed by the proactive control algorithms. When a reactive control algorithm interrupts operation of a proactive algorithm the motor controller can be setup with specific conditions which determine how and when the motor controller can return to Automatic Mode. For example, this return to Automatic Mode may be based upon a configurable predetermined time such as, for example, 12AM. In another embodiment, ASC 100 may return to Automatic Mode at a predetermined time interval (such as hour later), when a predetermined condition has been reached (for example, when the brightness returns below a certain level through certain sensors), when the brightness detected is a configurable percentage less than the brightness detected when the motor was placed into brightness override, if the proactive algorithms require the window covering to further cover the shade, when fuzzy logic routines weigh the probability that the motor can move back into automatic mode (based on information regarding actual brightness measurements internally, actual brightness measurements externally, the profile angle of the sun, shadow conditions from adjacent buildings or structures on the given building based on the solar azimuth, and/or the like), and/or at any other manual and/or predetermined condition or control.

Motors 130 may be configured to control the movement of one or more window coverings. The window coverings are described in greater detail below. As used herein, motors 130 can include one or more motors and motor controllers. Motors 130 may comprise AC and/or DC motors and may be mounted within or in proximity with a window covering which is affixed by a window using mechanical brackets attaching to the building structure such that motors 130 enable window covering to cover or reveal a portion of the window or glazing. As used herein, the term glazing refers to a glaze, glasswork, window, and/or the like. Motors 130 may be configured as any type of stepping motor configured to open, close and/or move the window coverings at select, random, predetermined, increasing, decreasing, algorithmic and/or any other increments. For example, in one embodiment, motor 130 may be configured to move the window coverings in ¹⁄₁₆-inch increments in order to graduate the shade movements such that the operation of the shade is almost imperceptible to the occupant to minimize distraction. In another embodiment, motor 130 may be configured to move the window coverings in ⅛-inch increments. Motor 130 may also be configured to have each step and/or increment last a certain amount of time. The time of the increments may be any range of time, for example, less than one second, one or more seconds, and/or multiple minutes. In one embodiment, each ⅛-inch increment of motor 130 may last five seconds. Motors 130 may be configured to move the window coverings at a virtually imperceptible rate to a structure's inhabitants. For example, ASC 100 may be configured to continually iterate motor 139 increments down the window wall in finite increments thus establishing thousands of intermediate stopping positions across a window pane. The increments may be consistent in span and time or may vary in span and/or time across the day and from day to day in order to optimize the comfort requirements of the space and further minimize abrupt window covering positioning transitions which may draw unnecessary attention from the occupants.

Motors 130 may vary between, for example, top-down, bottom-up, and even a dual motor 130 design known as fabric tensioning system (FTS) or motor/spring-roller combination. The bottom-up design may be configured to promote daylighting environments where light level through the top portion of the glass may be reflected or even skydomed deep into the space. Bottom-up window coverings naturally lend their application towards East facing facades where starting from sunrise the shade gradually moves up with the sun's rising altitude up to solar noon. Top-down designs may be configured to promote views whereby the penetration of the sun may be cutoff leaving a view through the lower portion of the glass. Top-down window coverings naturally lend their application towards the West facing facades where starting from solar noon the altitude of the sun drops the shade through sunset.

Analog board 115 may be configured with one or more electrical components configured to receive information from radiometers 125 and/or to transmit information to SSM board 105 and/or CCS 110. In one embodiment, analog board 115 may be configured to receive millivolt signals from radiometers 125. Analog board 115 may additionally be configured to convert the signals from radiometers 125 into digital information and/or to transmit the digital information to SSM board 105 and/or CCS 110.

ASC 100 may contain one or more radiometers 125 in communication with analog board 115. The more radiometers 125 used in ASC 100, the more error protection (or reduction) for the system. Radiometers 125, as used herein, may include traditional radiometers as well as other photo sensors, visible light spectrum photo sensors, temperature sensors, and the like. Radiometers 125 may be located in any part of a structure. For example, radiometers 125 may be located on the roof of a building, outside a window, inside a window, on a work surface, on an interior and/or exterior wall, and/or any other part of a structure. In one embodiment, radiometers 125 are located in clear, unobstructed areas. Radiometers 125 may be connected to analog board 115 in any manner through communication links 120. In one embodiment, radiometers 125 may be connected to analog board 115 by low voltage wiring. In another embodiment, radiometers 125 may be wirelessly connected to analog board 115.

Radiometers 125 may additionally be configured to initialize and/or synchronize upon starting ASC 100. For example, radiometers 125 may be configured to be initially set to zero, which may correspond to a cloudy sky condition regardless of the actual sky condition. Radiometers 125 may then be configured to detect sunlight for a user-defined amount of time, for example three minutes, in order to facilitate building a data file for the radiometers. After the user-defined time has lapsed, radiometers 125 may be synchronized with this new data file.

As discussed herein, communication links 120 may be configured as any type of communication links such as, for example, digital links, analog links, wireless links, optical links, radio frequency links, Bluetooth links, and/or copper wire links. For example, in one embodiment, communication link 120 may be configured as a RS422 serial communication link.

ASC 100 may additionally be configured with one or more databases. Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), Base3 by Base3 systems, Paradox or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on installation, initialization, user or the like. Furthermore, the security information may restrict/permit only certain actions such as accessing, modifying, and/or deleting data sets. In one example, the data set annotation indicates that only the data set owner or the user are permitted to delete a data set, various identified employees are permitted to access the data set for reading, and others are altogether excluded from accessing the data set. However, other access restriction parameters may also be used allowing various other employees to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications (e.g., communication link 120), inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stock-quotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, "IT Web Services: A Roadmap for the Enterprise," (2003), hereby incorporated herein by reference.

One or more computerized systems and/or users may facilitate control of ASC 100. As used herein, a user may include an employer, an employee, a structure inhabitant, a building administrator, a computer, a software program, facilities maintenance personnel, and/or any other user and/or system. In one embodiment, a user connected to a LAN may access ASC 100 to facilitate movement of one or more window coverings. In another embodiment, ASC 100 may be configured to work with one or more third-party shade control systems, such as, for example, Draper's IntelliFlex © Control System. In addition and/or in an alternative embodiment, a Building Management System (BMS), a lighting system and/or an HVAC System may be configured to control and/or communicate with ASC 100 to facilitate optimum interior lighting and climate control. Further, ASC 100 may be configured to be remotely controlled and/or controllable by, for example, a service center. ASC 100 may be configured for both automated positioning of the window coverings and a manual override capability, either through a programmable user interface such as a computer or through a control user interface such as a switch.

In one embodiment, an adaptive/proactive mode may be included. The adaptive/proactive mode may be configured to operate upon first installation for preset duration, whereby manual overrides of the automated settings may be logged and/or critical parameters identified which update the automated routines as to when a specific zone of shades should be deployed to a specific position. Averaging algorithms may be employed to minimize overcompensation. The manual override may be accomplished via a number of methodologies based on how accessible the capability is made to the occupant. In one embodiment, a manager or supervisor may be in charge of manually overriding the shade settings in order to mitigate issues where there may be a variance in comfort settings between individuals. However, override capability may be provided, for example, through switches, a telephone interface, a browser facility on the workstation, a PDA, touch screen, switch and/or by using a remote control. In open plan areas where multi-banded shades are employed, an infrared control may be employed so that the user points directly at the shadeband which needs to be operated. Thus, an infrared sensor may be applied by each band of a multibanded shade especially if the sensor is somewhat concealed. ASC 100 may additionally be configured with a preset timer wherein automatic operation of the window coverings will resume after a preset period after manual override of the system.

In another embodiment, ASC 100 is configured to facilitate control of one or more motor zones, shade bands and/or shade zone. Each motor zone may comprise one motor 130 for one to six shade bands. The shade zones include one or more motor zones and/or floor/elevation zones. For example, in a building that is twelve stories high, each tenant may have six floors. Each floor may comprise one shade zone, containing 3 motor zones. Each motor zone, in turn, may comprise 3 shade bands. A tenant on floors three and four may access ASC 100 to directly control at least one of the shade zones, motor zones and/or shade bands of its floors, without compromising or affecting the shade control of the other tenants.

In another embodiment, ASC 100 is configured with a "Shadow Program," to adapt to shadows caused by nearby buildings. For example, the shadow program uses a computer model of adjacent buildings and topography to model and characterize the shadows caused by surrounding nearby buildings on different parts of the object building. That is, ASC 100 may use the shadow program to raise the shades for all motor zones and/or shade zones that are in shadow from an adjacent building, from trees and mountains, from other physical conditions in addition to buildings, and/or from any other obstruction of any kind. This further facilitates maximization of daylight for the time the specific motor zones and/or shade zones are in shadow. When the shadow moves to other motor and/or shade zones (as the sun moves), ASC 100 may revert to the normal operating program protocols and override the shadow program. Thus ASC 100 can maximize natural interior daylighting and help reduce artificial interior lightning needs.

ASC 100 solar tracking algorithms may be configured to respect and analyze the position of the glazing (i.e., vertical, horizontal, sloped in any direction) to determine the solar heat gain and solar penetration. ASC 100 may also use solar tracking algorithms to determine if there are shadows on the glazing, window wall and/or facade from the building's own architectural features. These architectural include, but are not limited to, overhangs, fins, louvers, and/or light shelves. Thus, if the building is shaded by any of these architectural features, the window covering may be adjusted accordingly using ASC 100 algorithms.

Figure 5:
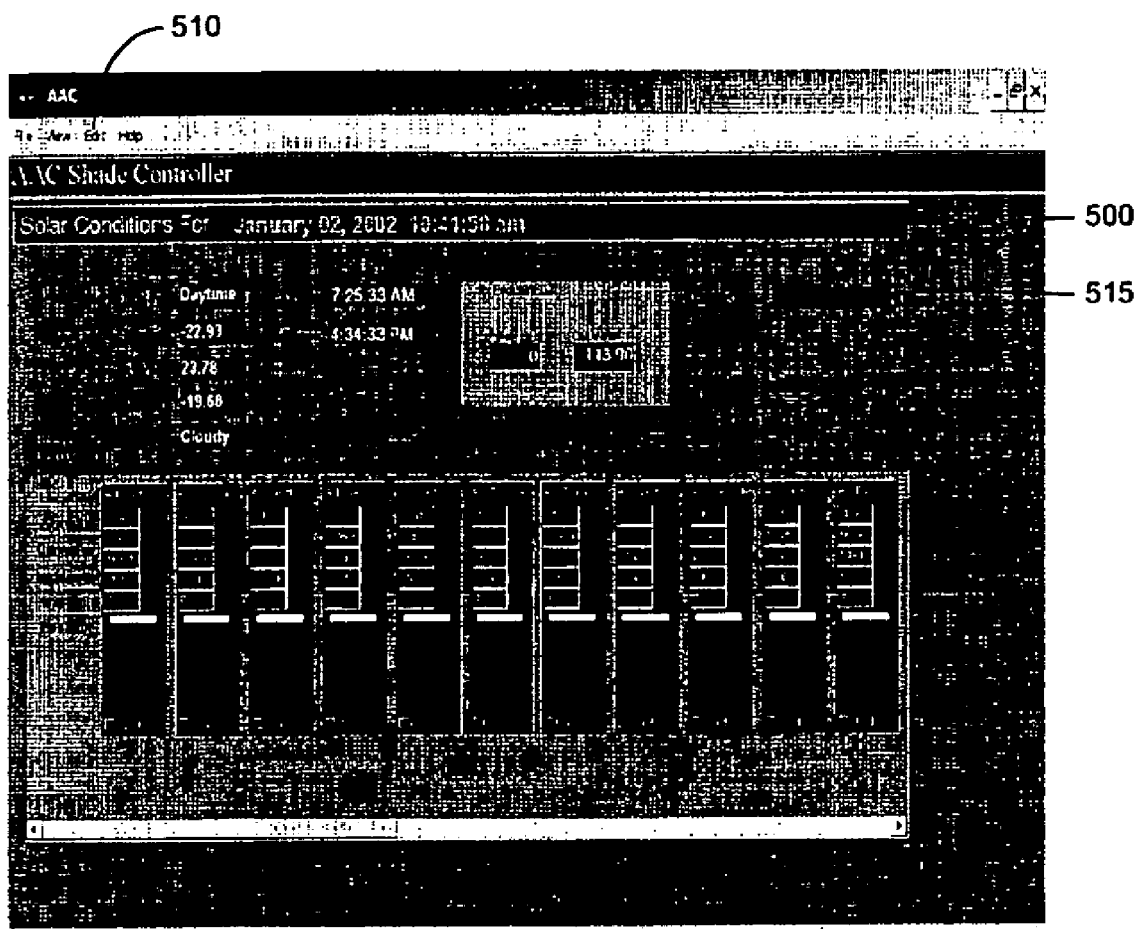
FIG. 5 is a screen shot of an exemplary user interface in accordance with the present invention.

ASC 100 may be configured with one or more user interfaces to facilitate user access and control. For example, as illustrated in an exemplary screen shot of a user interface 500 in FIG. 5, a user interface may include a variety of clickable links, pull down menus 510, fill-in boxes 515, and the like. User interface 500 may be used for accessing and/or defining the wide variety of ASC 100 information used to control the shading of a building, including, for example, geodesic coordinates of a building, the floor plan of the building, universal shade system commands (e.g., add shades up, down, etc.), event logging, the actual and calculated solar position, the actual and calculated solar angle, the actual and calculated solar radiation, the actual and calculated solar penetration angle and/or depth, the actual and/or calculated solar intensity, the measured brightness and veiling glare across the height of the window wall or a portion of the window (e.g. the vision panel), on any facades, task surfaces and/or floors, the current time, solar declination, solar altitude, solar azimuth, sky conditions, sunrise and sunset time, location of the various radiometers zones, the azimuth or surface orientation of each zone, the compass reading of each zone, the brightness at the window zones, the incidence angle of the sun striking the glass in each zone, the window covering positions for each zone, the heat gain, and/or any other parameters used or defined by the ASC 100 components, the users, the radiometers, the light sensors, the temperature sensors, and the like.

ASC 100 may also be configured to generate one or more reports based on any of the ASC 100 parameters as described above. For example, ASC 100 can generate daylighting reports based on floor plans, power usage, event log data, sensor locations, shade positions, shade movements, the relationship of sensor data to shade movements and/or to manual over-rides and/or the like. The reporting feature may also allow users to analyze historical data detail. For example, historical data regarding shade movement in conjunction with sky condition and brightness sensor data may allow users to continually optimize the system over time. As another example, data for a particular period can be compared from one year to the next, providing an opportunity to optimize the system in ways that have never been possible or practical with existing systems.

ASC 100 may be configured to operate in automatic mode (based upon preset window covering movements) and/or reactive modes (based upon readings from one or more radiometers 125, photo sensors, temperature sensors and the like). For example, an array of one or more visible light spectrum photo sensors may be implemented in reactive mode were they are oriented on the roof towards the horizon. The photo sensors may be used to qualify and/or quantify the sky conditions. Further, the photo sensors may be configured inside the structure to detect the amount of visible light within a structure. ASC 100 may further communicate with one or more artificial lighting systems to optimize the visible lighting within a structure based upon the photo sensor readings.

Figure 2:
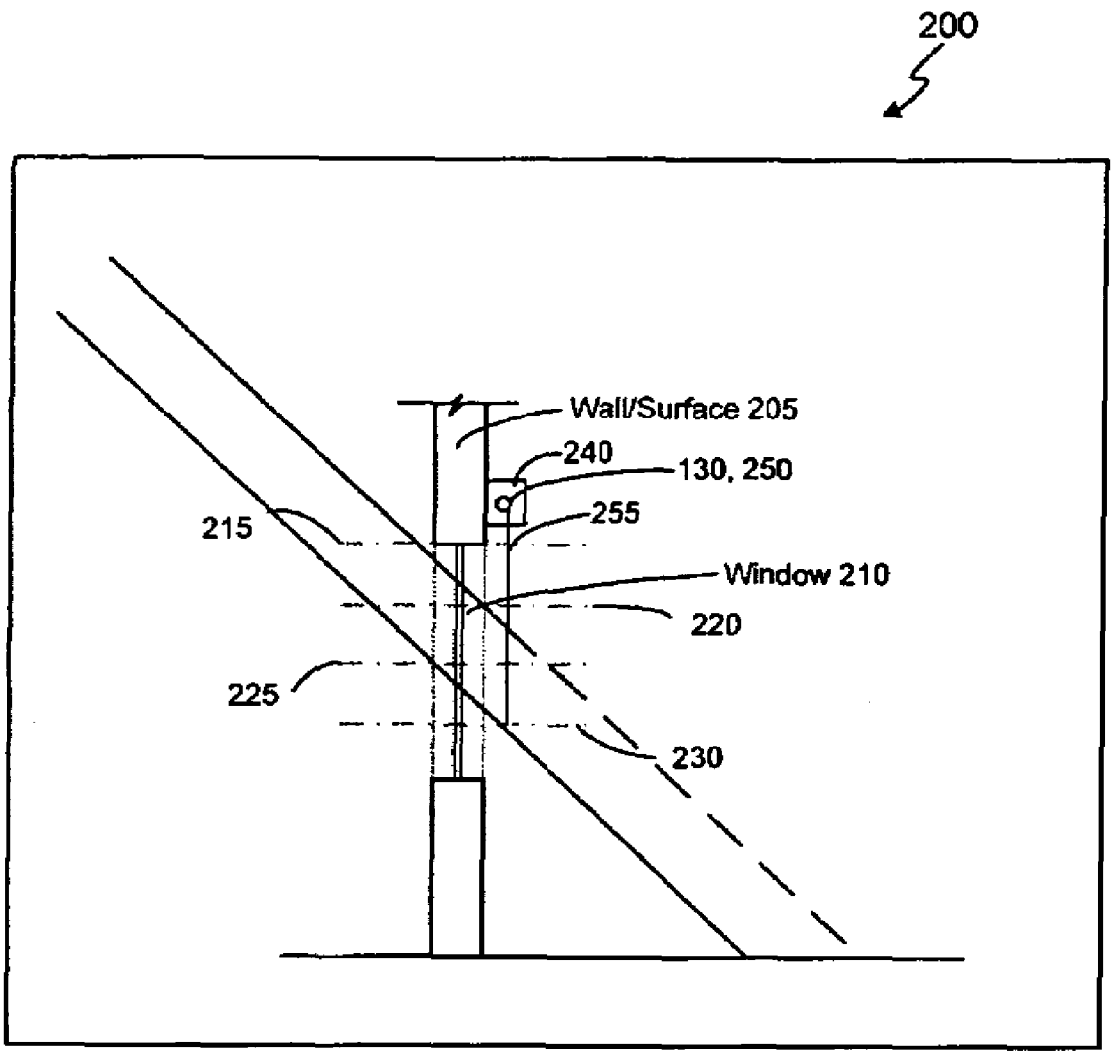
FIG. 2 is a schematic illustration of an exemplary window system in accordance with the present invention.

With reference to an exemplary diagram illustrated in FIG. 2, an embodiment of a window system 200 is depicted. Window system 200 comprises a structural surface 205 configured with one or more windows 210. A housing 240 may be connected to structural surface 205. Housing 240 may comprise one or more motors 130 and/or opening devices 250 configured for moving one or more window coverings 255.

Structural surface 205 may comprise a wall, a steel reinforcement beam, a ceiling, a floor, and/or any other structural surface or component. Windows 210 may comprise any type of window, including, for example, skylights and/or any other type of openings configured for sunlight penetration. Housing 240 may be configured as any type of housing, including, for example, ceramic pipes, hardware housings, plastic housings, and/or any other type of housing. Opening devices 250 may comprise pull cords, roller bars, drawstrings, ties, pulleys, levers, and/or any other type of device configured to facilitate moving, opening, closing, and/or varying window covering 255.

Window covering 255 may be any type of covering for a window for facilitating control of solar glare, brightness and veiling glare, contrasting brightness and veiling glare, illuminance ratios, solar heat gain or loss, UV exposure, uniformity of design and/or for providing a better interior environment for the occupants of a structure supporting increased productivity. Window coverings 255 may be any type of covering for a window, such as, for example, blinds, drapes, shades, Venetian blinds, vertical blinds, adjustable louvers or panels, fabric coverings with and/or without low E coatings, mesh, mesh coverings, window slats, metallic coverings and/or the like.

Window coverings 255 may also comprise two or more different fabrics or types of coverings to achieve optimum shading. For example, window coverings 255 may be configured with both fabric and window slats. Furthermore, an exemplary embodiment may employ a dual window covering system whereby two window coverings 255 of different types are employed to optimize the shading performance under two different modes of operation. For instance, under clear sky conditions a darker fabric color may face the interior of the building (weave permitting a brighter surface to the exterior of the building to reflect incident energy back out of the building) to minimize reflections and glare thus promoting a view to the outside while reducing brightness and veiling glare and thermal load on the space. Alternatively, during cloudy conditions a brighter fabric facing the interior may be deployed to positively reflect interior brightness and veiling glare back into the space thus minimizing gloom to promote productivity.

Window coverings 255 may also be configured to be aesthetically pleasing. For example, window coverings 255 may be adorned with various decorations, colors, textures, logos, pictures, and/or other features to provide aesthetic benefits. In one embodiment, window coverings 255 are configured with aesthetic features on both sides of the coverings. In another embodiment, only one side of coverings 255 are adorned. Window coverings 255 may also be configured with reflective surfaces, light-absorbent surfaces, wind resistance material, rain resistance material, and/or any other type of surface and/or resistance. While FIG. 2 depicts window coverings 255 configured within a structure, window coverings 255 may be configured on the outside of a structure, both inside and outside a structure, between two window panes and/or the like. Motor 130 and/or opening device 250 may be configured to facilitate moving window covering 255 to one or more positions along window 210 and/or structural surface 205. For example, as depicted in FIG. 2, motor 130 and/or opening device 250 may be configured to move window covering 255 to four different stop positions 215, 220, 225, 230.

Stop positions 215, 220, 225, 230 may be determined based on the sky type. That is, CCS 110 may be configured to run one or more programs to automatically control the movement of the motorized window coverings 255 unless a user chooses to manually override the control of some or all of the coverings 255. One or more programs may be configured to move window coverings 255 to shade positions 215, 220, 225, 230 depending on a variety of factors, including, for example, latitude, the time of day, the time of year, the measured solar radiation intensity, the orientation of window 210 and/or any other user-defined modifiers. Additionally, window coverings 255 may be configured to specially operate under a severe whether mode, such as, for example, during hurricanes, tornadoes, and the like. While FIG. 2 depicts four different stop positions, ASC 100 may comprise any number of shade and/or stop positions for facilitating automated shade control.

For example, shading on a building may cause a number of effects, including, for example, reduced heat gain, a variation in the shading coefficient, reduced visible light transmission to as low as 0-1%, lowered "U" value with the reduced conductive heat flow from "hot to cold" (for example, reduced heat flow into the building in summer), and/or reduced heat flow through the glazing in winter. Window coverings 255 may be configured with lower "U" values to facilitate bringing the surface temperature of the inner surface of window covering 255 closer to the room temperature. That is, to facilitate making inner surface of window covering 255 i.e. cooler than the glazing in the summer and warmer than the glazing in the winter. As a result, window coverings 255 may help occupants near the window wall to not sense the warmer surface of the glass and therefore feel more comfortable in the summer and require less air conditioning. Similarly, window coverings 255 may help during the winter months by helping occupants maintain body heat while sitting adjacent to the cooler glass, and thus require lower interior heating temperatures. The net effect is to facilitate a reduction in energy usage inside the building by minimizing room temperature modifications.

Figure 4:
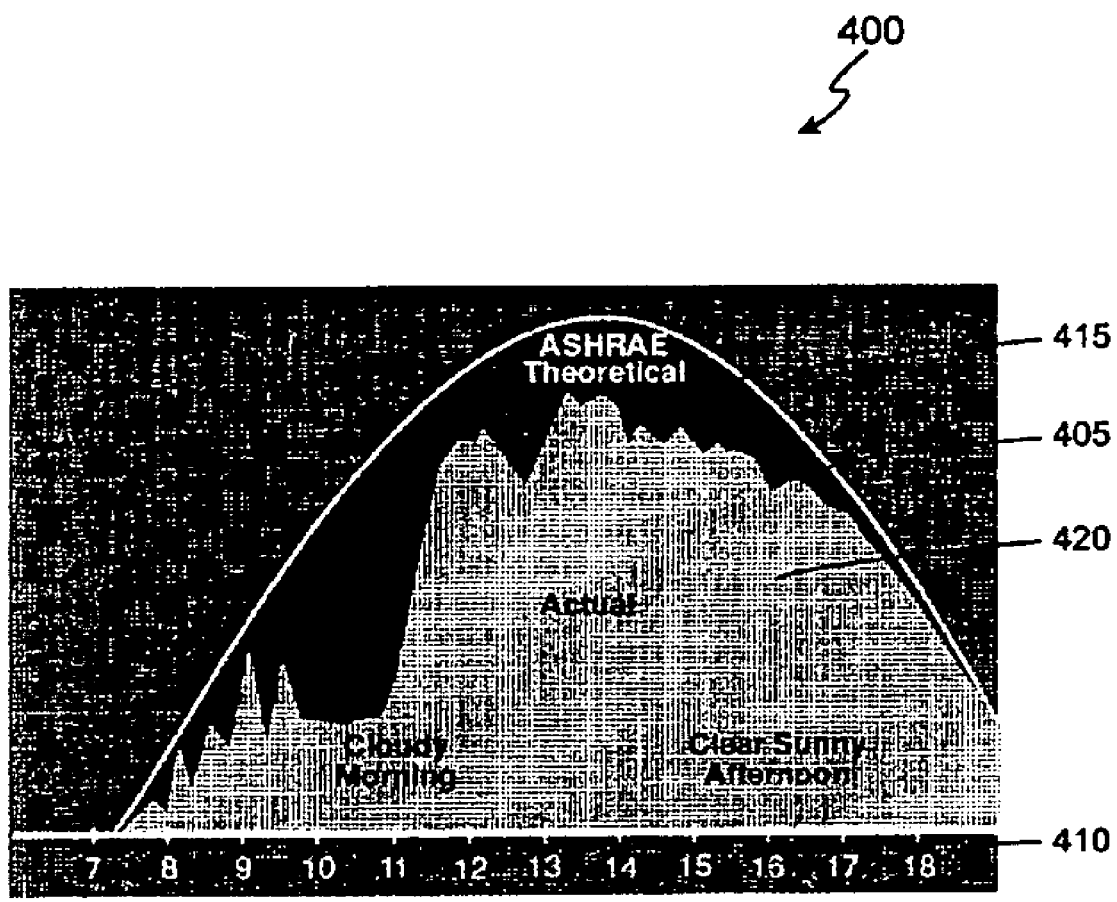
FIG. 4 is a depiction of an exemplary ASHRAE model in accordance with the present invention.

ASC 100 may be configured to operate in a variety of sky modes to facilitate movement of window coverings 255 for optimum interior lighting. The sky modes include, for example, overcast mode, night mode, clear sky mode, partly cloudy mode, sunrise mode, sunset mode and/or any other user configured operating mode. ASC 100 may be configured to use clear sky solar algorithms developed by the American Society of Heating, Refrigerating and Air-Conditioning Engineers (ASHRAE) and/or any other clear sky solar algorithms known or used to calculate and quantify sky models. For example, and with reference to FIG. 4, the ASHRAE model 400 may include a curve of the calculated clear sky solar radiation 405 as a function of time 410 and the integrated solar radiation value 415. Time 410 depicts the time from sunrise to sunset. The measured solar radiation values 420 may then be plotted to show the measured values to the calculated clear sky values. ASHRAE model 400 may be used to facilitate tracking sky conditions throughout the day. CCS 110 may be configured to draw a new ASHRAE model 400 every hour, every day, and/or at any other user-defined time interval.

ASC 100 may use the ASHRAE clear sky models in conjunction with one or more inputs from radiometers 125 to measure the instantaneous solar radiation levels within a structure and/or to determine the sky mode. CCS 110 may be configured to send commands to motors 130 and/or window openings 250 to facilitate adjustment of the position of window coverings 255 in accordance with the sky mode, the solar heat gain into the structure, the solar penetration into the structure, ambient illumination and/or any other user defined criteria.

For example, in one embodiment, the ASHRAE model can be used to provide a reduced heat gain which is measured by the shading coefficient factor of a fabric which varies by density, weave and color. In addition the window covering, when extended over the glass, may add a "U" Value (reciprocal to "R" value) and reduce conductive heat gain (i.e. reduction in temperature transfer by conduction.)

Figure 3:
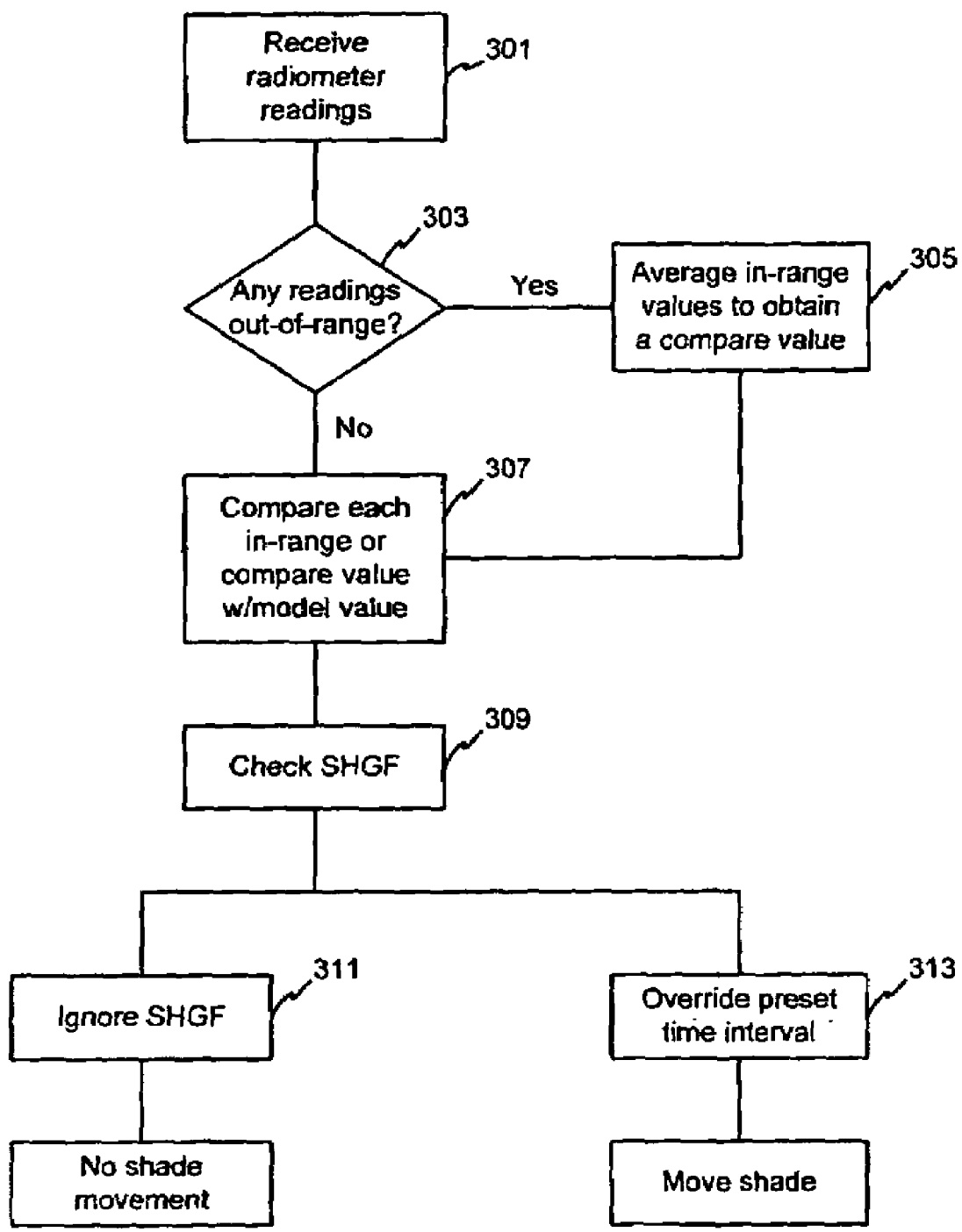
FIG. 3 is a flow diagram of an exemplary method for automated shade control in accordance with the present invention.

For example, with reference to a flowchart exemplified in FIG. 3, CCS 110 may be configured to receive solar radiation readings from one or more radiometers 125 (step 301). CCS 110 may then determine whether any of the radiometer readings are out-of-range, thus indicating an error (step 303). If any of the readings/values are out-of-range, CCS 110 may be configured to average the readings of the in-range radiometers to obtain a compare value (step 305) for comparison with an ASHRAE clear sky solar radiation model (step 307). If all readings are in-range, then each radiometer value may be compared to a theoretical solar radiation value predicted by the ASHRAE clear sky solar radiation model (step 307). That is, each radiometer may have a reading that indicates a definable deviation in percentage from the ASHRAE clear sky theoretical value. Thus, if the radiometer readings are all a certain percentage from the theoretical value, it can be determined that the conditions are cloudy or clear.

CCS 110 may also be configured to calculate and/or incorporate the solar heat gain (SHG) period for one or more zones (step 309). By calculating the SHG, CCS 110 may communicate with one or more sun sensors configured within ASC 100. The sun sensors may be located on the windows, in the interior space, on the exterior of a structure and/or at any other location to facilitate measuring the solar penetration and/or solar radiation and/or heat gain at that location. CCS 110 may be configured to compare the current position of one or more window coverings 255 to positions based on the most recent calculated SHG to determine whether window coverings 255 should be moved (step 309). CCS 110 may additionally determine the time of the last movement of window coverings 255 to determine if another movement is needed. For example, if the user-specified minimum time interval has not yet elapsed, then CCS 110 may be configured to ignore the latest SHG and not move window coverings 255 (step 311). Alternately, CCS 110 may be configured to override the user-defined time interval for window covering 255 movements. Thus, CCS 110 may facilitate movement of coverings 255 to correspond to the latest SHG value (step 313).

While FIG. 3 depicts the movement of window coverings 255 in a specific manner with specific steps, any number of these steps may be used to facilitate movement of window coverings 255. Further, while a certain order of steps is presented, any of the steps may occur in any order. Further still, while the method of FIG. 3 anticipates using radiometers and/or the SHG to facilitate movement of window coverings 255, a variety of additional and/or alternative factors may be used by CCS 110 to facilitate movement, such as, for example, the calculated solar radiation intensity incident on each zone, user requirements for light pollutions, structural insulation factors, light uniformity requirements, seasonal requirements, and the like.

For example, ASC 100 may be configured to employ a variety of iterations for the movement of window coverings 255. In one embodiment, ASC 100 may be configured to use a Variable Allowable Solar Penetration Program (VASPP), wherein ASC 100 may be configured to apply different maximum solar penetration settings based on the time of the year. These solar penetrations may be configured to vary some of the operation of ASC 100 because of the variations in sun angles during the course of a year. For example, in the wintertime (in North America), the sun will be at a lower angle and thus radiometers 125 and/or any other sensors used with the present invention may detect maximum BTUs (British Thermal Units), and there may be high solar penetration into a structure. That is, the brightness and veiling glare on the south and east orientations of the building will have substantial sunshine and brightness on the window wall for the winter months, for extended periods of the day from at least 10 am to 2pm. Under these situations, the allowable solar penetration setting of ASC 100 may be set lower to facilitate more protection due to the lower solar angles and higher brightness and veiling glare levels across the facade of the structure. In another embodiment, a shade cloth with a medium to medium dark value grey to the out side and a light medium grey to the interior at 2-3% openness, depending on the interior color may be used control brightness, maximize view and allow for the more open fabric.

In contrast, in the summertime, the sun will be at a higher angle minimizing BTU load, thus the allowable solar penetration for ASC 100 may be set higher to facilitate viewing during clear sky conditions. For example, the north, northwest and northeast orientations generally have much lower solar loads year round but do have the orb of the sun in the early morning and the late afternoon in summer, and may have brightness levels that exceed 2000 NITS; 5500 Lux (current window brightness default value) at various times of the year and day however for shorter periods. These high solar intensities are most prevalent during the three month period centered on June 21, the summer solstice. To combat this, ASC 100 may be configured so that the higher solar penetration does not present a problem with light reaching an uncomfortable position with regards to interior surfaces. Under these conditions, the VASPP may be configured with routine changes in solar penetration throughout the year, for example, by month or by changes in season (i.e., by the seasonal solstices). A minimum BTU load ("go"/"no-go") may additionally be employed in ASC 100 whereby movement of window coverings 255 may not commence unless the BTU load on the facade of a structure is above a certain preset level.

The VASPP may also be configured to adjust the solar penetration based on the solar load on the glass. For example, if the south facing elevation has a stairwell, it may have a different solar penetration requirement than the office area and different from the corner at the west elevation. Light may filter up and down the stairwell causing shades to move asymmetrically. As a result, window coverings 255 may be lowered or raised based upon the sun angle and solar heat gain levels (which may or may not be confirmed by active sensors before making adjustments). The VASPP may also be configured with an internal brightness and veiling glare sensor to facilitate fine-tuning of the levels of window coverings 255. Additionally, there may be one or more pre-adjusted set position points of window coverings 255 based on a day/brightness analysis. The day/brightness analysis may factor in any one or more of, for example, estimated BTU loads, sky conditions, daylight times, veiling glare, averages from light sensors and/or any other relevant algorithms and/or data.

In another aspect of the present invention, one or more optical photo sensors may be located in the interior, exterior or within a structure. The photo sensors may facilitate daylight/brightness sensing and averaging for reactive protection of excessive brightness and veiling glare due to unmodelable reflecting surfaces from the surrounding cityscape or urban landscape. These bright reflective surfaces may include but are not limited to; reflective glass on adjacent buildings; water surfaces; snow, bright surfaces exterior to the building which under specific solar conditions will send visually debilitating reflective light into the building.

Figure 6:
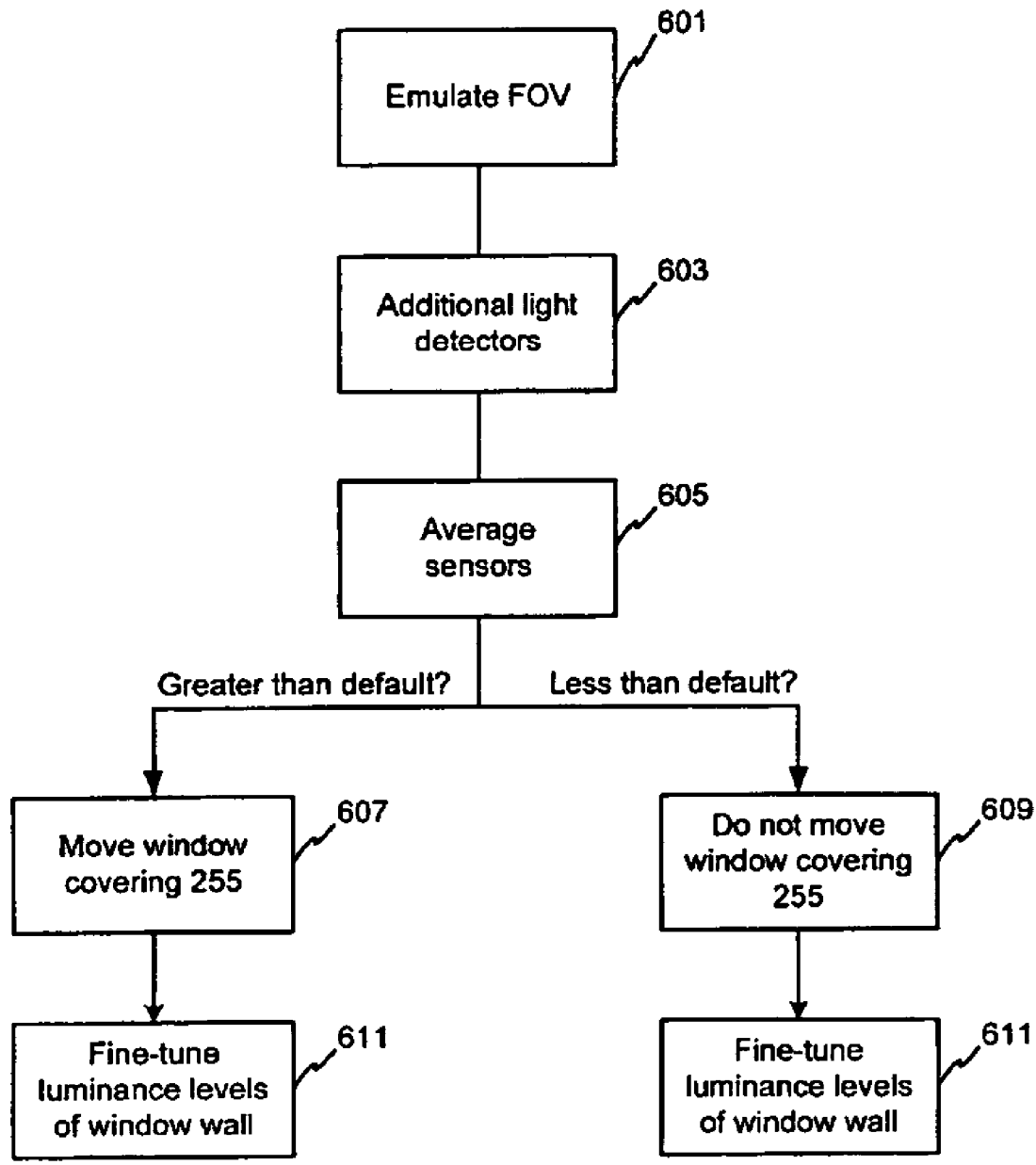
FIG. 6 is a flowchart of exemplary daylight/brightness and veiling glare sensing and averaging for reactive protection in accordance with the present invention.

In one exemplary method, and with reference to the flowchart depicted in FIG. 6, the sensors may be located about 30-36 inches from the floor and about 6-inches from the fabric to emulate the field of view (FOV) from a desk top (step 601). One or more additional sensors may detect light by looking at the light through window covering 255 while it moves through the various stop positions (step 603). The FOV sensors and the additional sensors may be averaged to determine the daylight levels (step 605). If the value of daylight levels is greater than a default value, ASC 100 may move window coverings 255 to another position (step 607). If the daylight levels do not exceed the default value, ASC 100 may not move window coverings 255 (step 609). Afterwards, ASC 100 may be configured for fine-tuning the illuminance levels of the window wall (step 611) by averaging the shaded and unshaded portion of the window. Fine tuning may be used to adjust the field of view from a desk top in accordance with the season, interior, exterior, and furniture considerations and/or task and personal considerations.

In another embodiment, ASC 100 may be configured with about 6-10 photo sensors positioned in the following exemplary locations: (1) one photo sensor looking at the fabric at about 3 feet 9 inches off the floor and about 3 inches from the fabric at a south elevation; (2) one sensor looking at the glass at about 3 feet 6 inches off the floor and about 3 inches from the glass at a south elevation; (3) one sensor looking at the dry wall at a south elevation; (4) one sensor mounted on a desktop looking at the ceiling; (5) one sensor mounted outside the structure looking south; (6) one sensor mounted outside the structure looking west; (7) one sensor about 3 inches from the center of the extended window covering 255 when window covering 255 is about 25% closed; (8) one sensor about 3 inches from the center of the extended window covering 255 when covering 255 is about 25% to 50% closed; (9) one sensor about 3 inches from the center of the glass; and (10) one sensor about 3 inches from the middle of the lower section of a window, approximately 18 inches off the floor. In one embodiment, ASC 100 may average the readings from, for example, sensors 10 and 7 described above. If the average is above a default value and the ASC has not moved window covering 255, covering 255 may be moved to an about 25% closed position. Next, ASC 100 may average the readings from sensors 10 and 8 to determine whether window covering 255 should be moved again.

In another embodiment, ASC 100 may be configured to average the reading from sensors 2 and 1 above. ASC 100 may use the average of these two sensors to determine a "go" or "no go" value. That is, if the glass sensor (sensor 2) senses too much light and ASC 100 has not moved window covering 255, covering 255 will be moved to a first position. ASC 100 will then average the glass sensor (sensor 2) and the sensor looking only at light through the fabric (sensor 1). If this average value is greater then a user-defined default value, window coverings 255 may be moved to the next position and this process will be repeated. If ASC 100 has previously dictated a window covering position based upon the solar geometry and sky conditions (as described above), ASC 100 may be configured to override this positioning to lower and/or raise window coverings 255. If the average light levels on the two sensors drop below the default value, the positioning from the solar geometry and sky conditions will take over.

In another similar embodiment, a series of photo sensors may be employed discretely behind an available structural member such as a column or staircase whereby, for example, these sensors may be located approximately 3 to 5 feet off the fabric and glass surfaces. Four sensors may be positioned across the height of the window wall corresponding in mounting height between each of potentially five alignment positions (including full up and full down). These sensors may even serve a temporary purpose whereby the levels detected on these sensors may be mapped over a certain time period either to existing ceiling mounted photo sensors already installed to help control the brightness and veiling glare of the lighting system in the space or even to externally mounted photo sensors in order to ultimately minimize the resources required to instrument the entire building.

In another exemplary embodiment, ASC 100 may be configured with one or more additional light sensors that look at a window wall. The sensors may be configured to continuously detect and report the light levels as the shades move down the window. ASC 110 may use these light levels to compute the luminous value of the entire window walls, and it may use these value to facilitate adjustment of the shades. In one embodiment, three different sensors are positioned to detect light from the window wall. In another embodiment, two different sensors are positioned to detect light from the window wall. A first sensor may be positioned to view the window shade at a position corresponding to window covering 255 being about 25% closed, and a second sensor may be positioned to view the window at a position of about 75% closed. The sensors may be used to optimize light threshold, differentiate between artificial and natural light, and/or utilize a brightness and veiling glare sensor to protect against overcompensation for brightness and veiling glare. This method may also employ a solar geometry override option. That is, if the light values drop to a default value, the movement of window coverings 255 may be controlled by solar geometric position instead of light levels.

Additionally, ASC 100 may be configured with one or more sensors looking at a dry interior wall. The sensors may detect interior illuminance and compare this value with the average illuminance of one or more sensors looking at the window wall. This ratio may be used to determine the positioning of window coverings 255 by causing coverings 255 to move up or down in order to achieve an interior lighting ratio of dry wall illuminance to window wall illuminance ranging from about, for example, 9:1 to 15:1. Other industry standard configurations employ illuminance ratios of 3:1 regarding a 30 degree cone of view (central field of vision) around the VDU (Video Display Unit), 10:1 regarding a 90 degree cone of view around the VDU and a ratio of 30:1 regarding back wall illuminance to the VDU. Sensors may be placed strategically throughout the room environment in order to bring data to the controller to support these types of algorithms.

In yet another embodiment, ASC 100 may also be configured to accommodate transparent window facades following multi-story stair sections which tend to promote a "clerestory-like" condition down a stairway (i.e., the upper portion of a wall that contains windows supplies natural light to a building). ASC 100 may be configured to use the solar tracking algorithm to consider a double-height facade to ensure that the penetration angle of the sun is properly accounted for and controlled. The photo sensor placement and algorithms may be placed to help detect and overcome any overriding brightness and veiling glare originating from reflections from light penetration through the upper floors.

In another embodiment, ASC 100 may employ any combination of photo sensors located on the exterior of the building and/or the interior space to detect uncomfortable light levels during sunrise and sunset which override the window covering settings established by the solar tracking under these conditions.

In another embodiment, ASC 100 may be configured to detect bright overcast days and establish the appropriate window covering settings under these conditions. Bright overcast days tend to have a uniform brightness in the east and west while the zenith tends to be approximately one-third the brightness of the horizons which is contrary to a bright, clear day where the zenith is typically three times brighter than the horizon. Exterior photo sensors and/or radiometers 125 may be configured to detect these conditions. Under these conditions, the window coverings (top-down) may be pulled down to just below the desk height in order to promote proper illumination at the desk surface while providing a view to the cityscape. Internal photo sensors may also be helpful in determining this condition and may allow the window coverings to come down to only 50% and yet preserve the brightness and veiling glare comfort derived by illuminance ratios in the space.

Overriding photo sensors may also be strategically placed on each floor and connected to ASC 100 to help detect glare reflections from the urban landscape as well as to handle changes made in the urban landscape and ensure the proper setting for the shades to maintain visual comfort. These photo sensors may also be employed to help reduce veiling glare and brightness problems at night in urban settings where minimal signage thresholds imposed on surrounding buildings and the instrumented building may pose unusual lighting conditions that cannot be modeled. In some cases, these situations may be static whereby a photo sensor may be unnecessary and a timer may simply be employed to handle these conditions based on occupancy which is information that may be provided from the building's lighting system.

As mentioned herein, ASC 100 may be configured to communicate with a Building Management System (BMS), a lighting system and/or a HVAC system to facilitate optimum interior lighting and climate control. For example, ASC 100 may be used to determine the solar load on a structure and communicate this information to the BMS. The BMS, in turn, may use this information to proactively and/or reactively set the interior temperatures and/or light levels throughout the structure to avoid having to expend excessive energy required to mitigate already uncomfortable levels, and to avoid a lag time in response to temperature changes on a building. For example, in typical systems, a BMS responds to the heat load on a building once that heat load has been registered. Because changing interior environment of a building takes significant energy, time and resources, there is a substantial lag in response time by a BMS to that heat load gain. In contrast, the proactive and reactive algorithms and systems of ASC 100 are configured to actively communicate to BMS regarding changes in brightness, solar angle, heat, and the like, such that BMS can proactively adjust the interior environment before any uncomfortable heat load/etc. on a building is actually registered.

Furthermore, ASC 100 may be given the priority to optimize the window covering settings based on energy management and personal comfort criteria after which the lighting system and HVAC system may be used to supplement the existing condition where the available natural daylight condition may be inadequate to meet the comfort requirements. Communication with a lighting system may be imperative to help minimize the required photo sensor resources where possible and to help minimize situations where closed loop sensors for both the shading and lighting control algorithms may be affected by each other. Oftentimes the lighting system may overcompensate an existing bright window wall where the lighting system may lower the dimming setting too far and thus create a "cave effect" whereby the illuminance ratio from the window wall to the surrounding wall and task surfaces may be too great for comfort. Proper photo sensor instrumentation for illuminance ratio control may be configured to help establish the correct setting for the shades as well as for the lights even though it may cost more energy to accomplish this comfort setting. In addition, the lighting sensor may also provide the shading system with occupancy information which may be utilized in multi-use spaces to help accommodate different modes of operation and functionality. For instance, an unoccupied conference room may go into an energy conservation mode with the window coverings being deployed all the way up or down in conjunction with the lights and HVAC to minimize solar heat gain or maximize heat retention. Furthermore, the window coverings may otherwise enter into a comfort control mode when the space is occupied unless overridden for presentation purposes.

ASC 100 may also be configured to be customizable and/or fine-tuned to meet the needs of a structure and/or its inhabitants. For example, the different operating zones may be defined by the size, geometry and solar orientation of the window openings. ASC 100 control may be configured to be responsive to specific window types by zone and/or to individual occupants. ASC 100 may also be configured to give a structure a uniform interior/exterior appearance instead of a "snaggletooth" look that is associated with irregular positioning of window attachments.

ASC 100 may also be configured to receive and/or report any fine-tuning request and/or change. Thus, a remote controller and/or local controller may better assist and or fine-tune any feature of ASC 100. ASC 100 may also be configured with one or more global parameters for optimizing control and use of the system. Such global parameters may include, for example, the structure location, latitude, longitude, local median, window dimensions, window angles, date, sunrise and sunset schedules, one or more communication ports, clear sky factors, clear sky error rates, overcast sky error rates, solar heat gain limits for one or more window covering positions, positioning timers, the local time, the time that the shade control system will wait before moving the shades from cloudy to clear sky conditions (or vise versa) and/or any other user-defined global parameter.

ASC 100 may also be configured to operate, for example, in a specific mode for sunrise and/or sunset because of the low heat levels, but high sun spot, brightness and veiling glare associated with these sun times. For example, in one embodiment, ASC 100 may be configured with a solar override during the sunrise that would bring window coverings 255 down in the east side of the structure and move them up as the sun moves to the zenith. Conversely, during sunset, ASC 100 may be configured to move window coverings 255 down on the west side of the structure to correspond to the changing solar angle during this time period. When trying to preserve a view under unobtrusive lighting conditions, a Sunrise Offset Override or a Sunset Offset Override may lock in the shade position and prevent the ASC from reacting to solar conditions for a preset length of time after sunrise or a preset length of time before sunset.

As will be appreciated by one of ordinary skill in the art, the present invention may be embodied as a customization of an existing system, an add-on product, upgraded software, a stand-alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for facilitating control of daylighting of an interior space, said system configured with:
   a motor;
   a window covering, wherein said motor is configured to actuate said window covering;
   at least one of a radiometer and a photometer to detect lighting information;
   a motor controller configured to control said motor using a proactive algorithm, said proactive algorithm incorporating said lighting information;
   a first ratio representing the number of said motors to the number of said motor controllers; and,
   a second ratio representing the number of said motor controllers to the number of centralized motor controllers, wherein said first ratio includes whole numbers greater than a one-to-one ratio, and said second ratio includes whole numbers greater than a one-to-one ratio.

2. The system of claim 1, wherein said proactive algorithm is configured to operate through said centralized motor controllers, wherein said centralized motor controllers is configured to facilitate management of a plurality of motors and window coverings simultaneously.

3. The system of claim 2, wherein said centralized controller is at least one of a PC and a centralized controller coupled to a PC.

4. The system of claim 1, wherein said motor controller comprises a real time clock.

5. The system of claim 1, wherein said motor is configured to actuate said window covering in a preset position increment wherein said preset position increment is at least about 1/16-inch.

6. The system of claim 1, further comprising a reactive control algorithm.

7. The system of claim 1, wherein said proactive algorithm incorporates at least one of: geodesic coordinates of a building; a actual solar position and a calculated solar position; a actual solar angle and a calculated solar angle; a actual solar radiation and a calculated solar radiation; a actual solar penetration angle and a calculated solar penetration angle; a actual solar intensity and a calculated solar intensity; a measured brightness and veiling glare across a portion of at least one of a window wall on a facade, a task surface, a ceiling and a floor; time; solar declination; solar altitude; solar azimuth; sky conditions; sunrise time and sunset time; a location of a radiometer; a surface orientation of a window; a compass reading of a window; an incidence angle of sun striking a window; a window covering position; a minimum BTU load; and solar heat gain.

8. The system of claim 1, wherein said system is further configured to communicate with at least one of a building management system and an HVAC system to facilitate optimization of at least one of interior lighting and environmental temperature.

9. The system of claim 1, further comprising a timer associated with said window covering, said timer configured to activate after movement of said window covering, and wherein said motor controller is configured to prevent movement of said window covering during said timer activation.

10. The system of claim 1, wherein daylighting includes at least one of daytime lighting, nighttime lighting control, dusk lighting and dawn lighting.

11. A system for facilitating control of daylighting of an interior space, said system configured with:
   a motor;
   a window covering, wherein said motor is configured to actuate said window covering, wherein said window covering comprises at least one of: roller shade, blinds, drapes, shades, Venetian blinds, vertical blinds, at least one of adjustable louvers and panels, at least one of moveable louvers and panels, fabric coverings with low E coatings, fabric coverings without low E coatings, mesh, mesh coverings, window slats, and metallic coverings;

at least one of a radiometer and a photometer to detect lighting information; and a motor controller configured to control said motor using a proactive algorithm, said proactive algorithm incorporating said lighting information, wherein said motor controller is configured to facilitate adjustment of said window covering position using shadow information based on at least one of cityscape and topographical conditions.

12. A system for facilitating control of daylighting of an interior space, said system configured with:
 a motor;
 a window covering, wherein said motor is configured to actuate said window covering;
 at least one of a radiometer and a photometer to detect lighting information; and
 a motor controller configured to control said motor using a proactive algorithm, said proactive algorithm incorporating said lighting information, wherein said motor controller is configured to incorporate ASHRAE clear sky algorithms.

13. A system for facilitating control of daylighting of an interior space, said system configured with:
 a motor;
 a window covering, wherein said motor is configured to actuate said window covering;
 at least one of a radiometer and a photometer to detect lighting information; and
 a motor controller configured to control said motor using a proactive algorithm, said proactive algorithm incorporating said lighting information, wherein said motor controller is configured to log information related to a manual override of said system, and wherein said log information is used to modify said proactive algorithm.

14. A method for facilitating control of daylighting of an interior space comprising:
 receiving an input from at least one of a photosensor, a radiometer and a temperature sensor at a motor controller;
 analyzing said input using a reactive algorithm and an ASHRAE clear sky model to form a movement request; and
 communicating said movement request to a motor, wherein said motor facilitates automated movement of a window covering.

15. The method of claim 14, wherein said step of analyzing said input further includes using a proactive algorithm.

16. The method of claim 14, wherein said reactive algorithm comprises information based on at least one of: geodesic coordinates of a building; a measured brightness and veiling glare across a portion of at least one of a window wall on a facade, a task surface, a ceiling and a floor; time; solar declination; solar altitude; solar azimuth; sky conditions; sunrise time and sunset time; a location of a radiometer; a surface orientation of a window; a compass reading of a window; an incidence angle of sun striking a window; a window covering position; a minimum BTU load; and solar heat gain.

17. A method for facilitating control of daylighting of an interior space comprising:

receiving an input from at least one of a photosensor, a radiometer and a temperature sensor at a motor controller;
analyzing said input using a reactive algorithm to form a movement request; and
communicating said movement request to a motor, wherein said motor facilitates automated movement of a window covering;
logging information related to manual overrides of said system; and,
modifying said reactive algorithm.

18. A method for facilitating control of daylighting of an interior space comprising:
 receiving an input from at least one of a photosensor, a radiometer and a temperature sensor at a motor controller;
 analyzing said input using a reactive algorithm to form a movement request; and
 communicating said movement request to a motor, wherein said motor facilitates automated movement of a window covering;
 inputting occupant tracking information into said reactive algorithm to adjust for manual overrides.

19. A method for facilitating automated shading comprising the steps of:
 reviewing a radiometer value;
 determining if said radiometer value is in range to form an in-range radiometer value;
 comparing said in-range radiometer value to an ASHRAE model value to obtain a comparison value; and
 moving a window covering based upon said comparison value.

20. The method of claim 19, further comprising the steps of:
 calculating a solar heat gain factor of a zone, wherein said zone comprises said window covering; and
 determining a time since a last movement of said window covering.

21. The method of claim 20, further comprising a step of using at least one of a proactive algorithm to facilitate movement of said window covering and a reactive algorithm to facilitate movement of said window covering.

22. An automated shade control system comprising:
 a window covering;
 a first photo sensor configured to look at a field-of-view from a task surface to develop a first reading;
 a second photo sensor configured to look through said window covering to develop a second reading;
 a third photo sensor configured to view and develop a third reading from at least one of: a wall, a ceiling, an outside a southern side of a structure, an outside a western side of a structure, an east side of a structure, a west side of a structure and a center of said window covering; and
 a processor configured to analyze said first reading, said second readings and said third reading to facilitate movement of said window covering.

23. The system of claim 22, further comprising at least one of a proactive algorithm configured to facilitate a movement of said window covering and a reactive algorithm configured to facilitate a movement of said window covering.

24. A method for controlling a window covering in a building, said method comprising:
 receiving user defined guideline data related to at least one of solar penetration and solar load;
 incorporating said user defined guideline data into a window management system, wherein said window management system includes data related to at least one of solar heat gain, window profile and sun incident angle associated with said building to enable said window management system to determine a standard window management routine;

obtain shadow study data related to said building;

incorporate said shadow study data into said window management system;

overriding said standard window movement routine; and, determining whether to move said window covering based upon said shadow study data.

25. The method of claim 24, wherein said step of determining whether to move said window covering based upon said shadow study data comprises at least one of maintaining said window covering open when said window associated with said window covering is at least partially within a shadow area, and raising a lowered window covering in which at least a portion of said shadow area is covering said window associated with said window covering.

26. The method of claim 24, further comprising integrating said shadow study data with environmental profile data related to said building.

27. The method of claim 26, wherein said environmental profile data includes at least one of a cityscape, another structure, topography and a natural structure.

* * * * *